United States Patent [19]
Hanson et al.

[11] Patent Number: 5,934,091
[45] Date of Patent: Aug. 10, 1999

[54] REFRIGERANT RECOVERY AND RECYCLING SYSTEM

[75] Inventors: Arnold M. Hanson, Minneapolis; Thomas Donald Chandler, Coon Rapids, both of Minn.

[73] Assignee: Century Manufacturing Company, St. Paul, Minn.

[21] Appl. No.: 08/960,521

[22] Filed: Oct. 31, 1997

[51] Int. Cl.$^6$ ................................................. F25B 19/04
[52] U.S. Cl. ................................. 62/149; 62/77; 62/474
[58] Field of Search .................................. 62/77, 149, 84, 62/95, 475, 470, 474

[56] References Cited

U.S. PATENT DOCUMENTS

| | | |
|---|---|---|
| 3,850,009 | 11/1974 | Villadsen .................................... 62/470 |
| 4,476,688 | 10/1984 | Goddard . |
| 4,768,347 | 9/1988 | Manz et al. . |
| 4,809,520 | 3/1989 | Manz et al. . |
| 4,862,699 | 9/1989 | Lounis . |
| 4,938,031 | 7/1990 | Manz et al. . |
| 4,942,741 | 7/1990 | Hancock et al. . |
| 4,967,570 | 11/1990 | Van Steenburgh, Jr. . |
| 4,993,461 | 2/1991 | Yamane . |
| 4,998,413 | 3/1991 | Sato et al. . |
| 5,005,369 | 4/1991 | Manz . |
| 5,012,651 | 5/1991 | Nakatani et al. . |
| 5,022,230 | 6/1991 | Todack . |
| 5,038,578 | 8/1991 | Manz et al. . |
| 5,040,382 | 8/1991 | Abraham . |
| 5,063,749 | 11/1991 | Manz . |
| 5,067,327 | 11/1991 | Leblanc . |
| 5,088,291 | 2/1992 | Squires . |
| 5,090,211 | 2/1992 | Peters . |
| 5,094,087 | 3/1992 | Gramkow . |
| 5,094,277 | 3/1992 | Grant . |
| 5,095,713 | 3/1992 | Laukhuf et al. . |
| 5,099,653 | 3/1992 | Major et al. . |
| 5,115,645 | 5/1992 | Abraham . |
| 5,123,259 | 6/1992 | Morgan, Sr. . |
| 5,161,385 | 11/1992 | Schumacher . |
| 5,172,562 | 12/1992 | Manz et al. . |
| 5,195,333 | 3/1993 | Van Steenburgh, Jr. . |
| 5,203,177 | 4/1993 | Manz et al. ............................... 62/149 |
| 5,211,024 | 5/1993 | Manz et al. . |
| 5,214,927 | 6/1993 | Squires . |
| 5,243,832 | 9/1993 | Van Steenburgh, Jr. . |
| 5,245,840 | 9/1993 | Van Steenburgh, Jr. . |
| 5,325,675 | 7/1994 | Manz et al. . |
| 5,327,741 | 7/1994 | Mason et al. . |
| 5,353,603 | 10/1994 | Outlaw et al. . |
| 5,377,499 | 1/1995 | Zugibe . |
| 5,379,697 | 1/1995 | Sergius . |
| 5,406,806 | 4/1995 | Ricketts et al. . |
| 5,442,930 | 8/1995 | Stieferman . |
| 5,617,731 | 4/1997 | Scaringe . |

*Primary Examiner*—Henry Bennett
*Assistant Examiner*—Mark Steel
*Attorney, Agent, or Firm*—Merchant & Gould P.C.

[57] ABSTRACT

An apparatus for recovering and recycling refrigerant from an air conditioning unit. The apparatus includes a combined oil separator and heat exchanger for condensing purified refrigerant and for vaporizing contaminated refrigerant. The combined oil separator and heat exchanger includes a canister having a top wall, a bottom wall, and a substantially cylindrical side wall. The canister further includes a high pressure region comprising heat exchange coils and having high pressure inlet for providing purified refrigerant vapor and high pressure outlet for removing purified refrigerant liquid, and a low pressure region having low pressure inlet for introducing contaminated refrigerant proximate the heat exchange coils, low pressure outlet through the top wall for removal of refrigerant vapor, and condensed oil outlet for removal of condensed oil. By introducing the contaminated refrigerant proximate the heat exchange coils, improved separation efficiency is obtained. A method for utilizing the combined oil separator and heat exchanger is additionally provided.

12 Claims, 6 Drawing Sheets

REFRIGERANT RECOVERY AND RECYCLING SYSTEM

FIELD OF THE INVENTION

The present invention relates to an apparatus and method for recovering and recycling refrigerant from an air conditioning unit; to a combined heat exchanger and oil separator and for use in an apparatus for recovering and recycling refrigerant from an air conditioning unit; and to a method for improving the efficiency of a combined oil separator and heat exchanger for use in an apparatus for recovering and recycling refrigerant from an air conditioning unit.

BACKGROUND OF THE INVENTION

Most modern air conditioning equipment employ one of several organic solvent compositions, commonly referred to as chlorofluorocarbon compounds (CFCs), as a working fluid (refrigerant). For various reasons, such as wearing of the seals in the air conditioning equipment's compressor, the refrigerant in the equipment may eventually become contaminated with dirt, oil and/or moisture. These contaminants affect the efficiency of the equipment and may eventually lead to damage of the compressor and other components in the equipment. Thus, it is desirable to replace the refrigerant periodically to avoid damaging the equipment and to restore the equipment's overall efficiency. Also, in the event of a failure of the equipment, it is typically required that the refrigerant be removed from the equipment prior to servicing.

Previously, the most common method of removing the refrigerant from the equipment was to vent the refrigerant into the atmosphere and to replace it with virgin refrigerant as required. However, problems exist with this method of removing the refrigerant. The release of CFC compounds into the atmosphere results in the depletion of the ozone layer therein. As the ozone layer is the principal filter in the atmosphere for removing the sun's ultraviolet radiation, much concern has been expressed about its depletion as it is expected to lead to many problems. For example, it is expected that an upturn in related health problems such as skin cancer will occur. Accordingly, many governments are passing legislation restricting or prohibiting the use of and/or releases of CFC compounds into the atmosphere. These restrictions pose a serious problem to refrigeration equipment manufacturers and servicers who no longer can release CFC-type refrigerants into the atmosphere. Another problem in regard of venting of refrigerants to the atmosphere is that the virgin refrigerant compounds required for replacement of vented refrigerants are expensive and may be difficult to obtain.

Refrigerant recovery and recycling systems are described in, for example, U.S. Pat. Nos. 3,699,781; 4,285,206; 4,364,236; 4,805,416; 4,768,347; 4,809,520; 5,072,593; 5,245,840; 5,335,512; 4,809,520; 5,353,603; and 5,617,731.

Most automobile air conditioning units utilize either R-134a refrigerant or R-12 refrigerant. The R-12 refrigerant is often referred to as ozone depleting refrigerant and was commonly used in automobile systems until about the year 1993. Modern automobile systems use the R-134a refrigerant which is more environmentally friendly. Because of the use of different types of refrigerant, it is desirable to provide an apparatus that will recover and recycle each type of refrigerant.

SUMMARY OF THE INVENTION

The invention relates to an apparatus for recovering and recycling refrigerants from an air conditioning unit. The apparatus includes a contaminated refrigerant recovery line for conveying contaminated refrigerant, a combined oil separator and heat exchanger, a dryer for removal of moisture from vapor refrigerant, a compressor for compressing refrigerant, and a receiver tank for receiving condensed purified refrigerant. The combined oil separator and heat exchanger includes a canister having a top wall, a bottom wall, and a substantially cylindrical side wall. The canister additionally includes a high pressure region and a low pressure region. The high pressure region includes heat exchange coils and has a high pressure inlet through the top wall for providing purified refrigerant vapor, and a high pressure outlet through the top wall for removing purified refrigerant liquid. The heat exchange coils are provided in the lower region of the canister. The low pressure region includes a low pressure inlet through the bottom wall for introducing contaminated refrigerant proximate to heat exchange coils, and low pressure outlet through the top wall for removal of refrigerant vapor, and condensed oil outlet through the top wall for removal of condensed oil. By providing the combined oil separator and heat exchanger of the present invention, the Applicants believe they have achieved enhanced separation and efficiency between refrigerant and oil.

The low pressure inlet includes an evaporator injector having a tube for conveying contaminated refrigerant inside the combined oil separator and heat exchanger, and orifices directed downward for spraying contaminated refrigerant onto the coils. Preferably, the orifices are provided within about 5 inches of the coils, and more preferably within about 4 inches of the coils. It is an advantage of the present invention that the evaporator injector sprays the contaminated refrigerant onto the heat exchange coils in order to enhance the separation efficiency between the vapor refrigerant and the oil. By spraying the contaminated refrigerant onto the coils, enhanced agitation of fluid on the coils is provided resulting in increased heat transfer. Furthermore, the proximate location of the spray to the coils reduces the condensation problem associated with having cold liquid fall through vapor which accumulates in the upper region of the canister.

The dryer is provided for removal of moisture from vapor refrigerant from the low pressure outlet of the combined oil separator and heat exchanger. The compressor is provided for compressing the purified refrigerant from the dryer to provide a warm, high pressure refrigerant line for feeding through the high pressure inlet in the combined oil separator and heat exchanger, and through the heat exchange coils. The receiver tank is provided for receiving condensed purified refrigerant from the high pressure outlet of the combined oil separator and heat exchanger.

The invention relates to a method for recovering and recycling refrigerant from an air conditioning unit. The method includes steps of providing a source of contaminated refrigerant for conversion to purified refrigerant; introducing the contaminated refrigerant into a lower region of a combined oil separator and heat exchanger; feeding separated volatile component to a dryer for removal of moisture and to a compressor for compressing refrigerant from the dryer to provide compressed, purified refrigerant; and feeding the compressed, purified refrigerant from the compressor to the high pressure inlet in the combined oil separator and heat exchanger to provide a condensed refrigerant. The method can include a step of charging purified refrigerant into an automobile air conditioning unit.

The invention further relates to a combined oil separator and heat exchanger for use in an apparatus for recovering and recycling refrigerants from an air conditioning unit. It is this combined oil separator and heat exchanger which provides enhanced refrigerant and oil separation compared with prior art devices. In addition, the invention relates to a method for improving the efficiency of a combined oil separator and heat exchanger for use in an apparatus for recovering and recycling refrigerant from an air conditioning unit.

BRIEF DESCRIPTION OF THE DRAWINGS

A preferred embodiment of the invention will now be described, by way of example only, with reference to the attached figures wherein.

DETAILED DESCRIPTION OF THE PREFERRED EMBODIMENT

Figure 1:
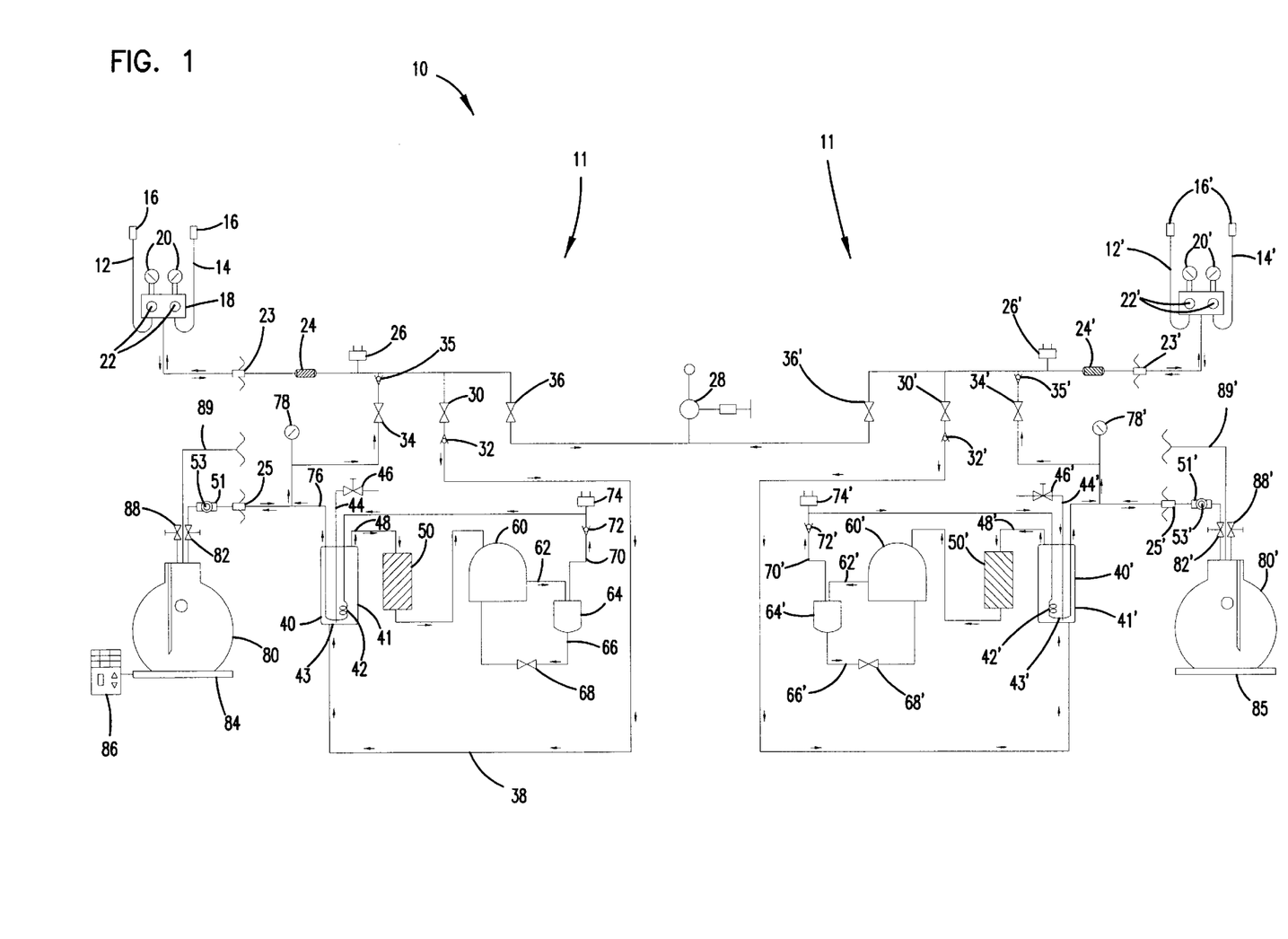
FIG. 1 shows a schematic representation of a dual refrigerant recovery and recycling system in accordance with the present invention.

Now referring to FIG. 1, a schematic representation of a single pass, dual refrigerant recovery and recycling system according to the present invention is provided at reference numeral 10. The system 10 is referred to as single pass because the refrigerant passes through the system essentially once for purification, rather than being processed in a loop. The path of the refrigerant is indicated by the arrows. In addition, the system 10 is referred to as a dual system because it provides for the recovery and recycling of two incompatible types of refrigerant. The system can be used to recover and recycle R-12 refrigerant and R-134a refrigerant from automobile air conditioning systems. FIG. 1 shows a schematic of a system for recovering and recycling R-134a refrigerant from an automotive air conditioning system at reference numeral 11, and a schematic of a system for recovering and recycling R-12 refrigerant from an automotive refrigerant systems at reference numeral 11'. It should be appreciated that the steps and equipment provided for both systems correspond but may be different to reflect the different materials processed. The two types of refrigerant are incompatible and should not be mixed. The following description of the operation of the system 11 generally refers to the system for recovering and recycling R-134a refrigerant, and it should be appreciated that the description applies to the system for recovering and recycling R-12 refrigerant wherein reference numeral are used with the prime designation to identify similar structure.

Now with reference to FIG. 1, the recovery and recycling of contaminated refrigerant from an automotive air conditioning unit is discussed in detail. The following description will generally take the form of identifying the steps for processing contaminated refrigerant recovered from an automobile air conditioning unit through the system 11 to provide a purified refrigerant, and then charging purified refrigerant into the automobile air conditioning unit.

The system 11 includes a low pressure side hose 12 and a high pressure side hose 14 for connecting, via hose fittings 16, to the low pressure side and the high pressure side, respectively, of an automobile air conditioning unit. The hose fittings include valves which, once attached to the appropriate port on the automobile air conditioning system, can be opened to provide flow therethrough. The hoses 12 and 14 connect to a manifold set 18 having pressure gauges 20 for measuring the pressure in the low side hose 12 and the high side hose 14, and valves 22 for selectively opening and closing flow through the low side hose 12 and the high side hose 14. When contaminated refrigerant is draining from the automobile air conditioning unit, both valves 22 are preferably open to allow contaminated refrigerant to drain more quickly. The refrigerant obtained from the automobile air conditioning unit is referred to as contaminated refrigerant because it is likely to include particulates, oil, water, and air which should be removed to a desired extent to provide purified refrigerant which can then be introduced back into the automobile air conditioning system. In the context of the following description, the refrigerant may be referred to as the processing fluid.

The symbols identified at reference numerals 23 and 25 are meant to represent a port in the bulkhead where hoses can be connected and disconnected. As shown in FIG. 1, the components provided to the right side of bulkhead ports 23 and 25 in the system 11 are generally provided within a container and the components provided to the left of the bulkhead ports 23 and 25 are generally more accessible. The bulkhead ports 23 and 25 are identified in FIG. 5.

The contaminated refrigerant passes through the manifold set 18 and flows through the strainer 24 for removal of particulates. A commercially available strainer which can be used in this invention is 10 $\mu$m strainer available from Parker, Inc. The refrigerant then passes by vacuum switch 26 which senses the pressure in the line and activates the vacuum pump 28 when the pressure in the line decreases to 8 inches of mercury. The vacuum pump 28 then runs for a predetermined amount of time in order to dry out and evacuate of the automobile air conditioning system.

The refrigerant passes from the strainer 24 through the recovery solenoid valve 30 and past the recovery check valve 32. While recovering contaminated refrigerant from the automobile air conditioning unit, the recovery solenoid valve 30 is opened and the charge solenoid valve 34 and the evacuate solenoid valve 36 are closed. This arrangement provides that the recovered refrigerant flows through the recovery solenoid valve 30 for processing. The recovery check valve 32 is provided to ensure that the refrigerant does not flow in the reverse direction.

The refrigerant recovered from the automobile air conditioning unit is likely to be a combination of gas and liquid. The refrigerant flows out of the automobile air conditioning unit under pressure, which causes the refrigerant to flow through the recovery system and into the combined oil separator and heat exchanger 40. The refrigerant enters the combined oil separator and heat exchanger 40 in the lower region 41 proximate the heat exchange coils 42. The heat exchange coils 42 are warmer than the contaminated refrigerant entering via the line 38, resulting in heat transferring to the refrigerant and vaporization of the volatile components in the refrigerant. The oil contained within the refrigerant is not volatilized, and gravity causes the oil to settle in a puddle 43 in the lower region 41 of the combined oil separator and heat exchanger 40. The oil puddle 43 is allowed to drain through the top of the combined oil separator and heat exchanger 40 via the oil drain line 44 which extends into the oil puddle 43. Once the valve 46 is opened, pressure within the combined oil separator and heat exchanger 40 causes oil to rise through the oil recovery line 44 and into a container 212 for subsequent handling thereof. The valve 46 is generally not opened until after the refrigerant recovery process is completed. It is believed that causing the oil to drain out the top of the combined oil separator and heat exchanger 40 is advantageous because the hydrostatic head created by the column of oil helps provide better control of the rate the oil is removed by slowing the rate of oil removal and decreasing the amount of splattering of oil as it drains, and by reducing the amount piping needed for the system in order to make the container 212 more accessible.

The volatilized components generally include refrigerant and moisture, and pass via line 48 from the combined oil separator and heat exchanger 40 into the filter/dryer 50. The filter/dryer is preferably a desiccant filter which removes water from the refrigerant. A commercially available desiccant filter which can be used in the invention is available from Alco, Inc. A sight glass 51 can be provided for determining when it is appropriate to replace the desiccant filter. If the water concentration in the purified refrigerant is too high, the desiccant filter should be replaced. It is expected that the desiccant filter will be replaced after about 30 hours of operation or after having serviced about 150 automobile air conditioning units. Preferably, the sight glass 51 includes a moisture indicator 53 which shows a green color when the purified refrigerant is sufficiently moisture-free. When the moisture indicator 53 turns yellow, the water concentration in the purified refrigerant is too high, and the desiccant filter 50 should be replaced.

The refrigerant leaves the filter/dryer 50 via line 52 as purified refrigerant and passes through the compressor 60. A commercially available compressor which can be used in this invention is a ⅓ hp compressor. In general, it is expected that the compressor 60 will compress the purified refrigerant to a pressure of at least about 100 psi. While passing through the compressor 60, the purified refrigerant tends to pick up small amounts of oil from the compressor. In order to maintain proper functioning of the compressor 60, it is desirable to remove the oil from the refrigerant and return it to the compressor. This concept of returning oil to a compressor is certainly not new and commercially available oil separators have been sold for this purpose for several decades. One such company that provides compressor oil separators is Temprite, Inc. The combination of refrigerant and oil then leaves the compressor 60 via line 62 under high pressure and enters the compressor oil separator 64. Once the high-pressure refrigerant containing small amounts of oil enters the oil separator 64, the oil precipitates out and collects at the bottom of the oil separator 64. An oil return line 66 is provided for returning the oil to the compressor 60. The oil return solenoid valve 68 opens in order to allow collected oil to flow from the oil separator 64 back to the compressor 60. Refrigerant then passes as a vapor out of the oil separator 64 via line 70 and through check valve 72. The check valve 72 prevents flow of refrigerant in the reverse direction.

Once the recovery cycle is completed, the valve 68 opens allowing oil which has collected in the bottom of the oil separator 64 to flow back into the compressor 60. Added benefits of opening the valve 68 include equalizing the pressure on both sides of the compressor 60 which enhances subsequent start up. Furthermore, opening the valve 68 pressurizes the combined oil separator and heat exchanger 40 so that the puddle of oil 43 collected therein can be pushed out through the top via line 44. Previous commercially available oil separators rely upon gravity for removing oil by draining through a hole in the bottom. In contrast, the combined oil separator and heat exchanger of the present relies upon pressure for forcing the separated oil out the top.

The high-pressure, purified refrigerant in line 70 is generally in the vapor gaseous state and is relatively warm. In order to convert the gaseous refrigerant into a liquid, heat is removed therefrom. The vaporous refrigerant is then fed back through the combined oil separator and heat exchanger 40 within the heat exchange coils 42. As heat is transferred from the heat exchange coils 42 to the contaminated refrigerant, the refrigerant inside the heat exchange coils 42 condenses and flows out of the combined oil separator and heat exchanger 40 via line 76. It is an advantage of the present invention that the combined oil separator and heat exchanger 40 performs the functions of an oil separator, a heat exchanger, and a condenser, which are components found in prior art refrigerant recovery and recycle systems. Thus, the refrigerant recovery and recycle system of the present invention provides for a system which does not include separate oil separator, heat exchanger, and condenser. Rather, all three are provided in the combined oil separator and heat exchanger 40.

As a safety device, a high pressure cut off switch 74 is provided in communication with line 70. If the pressure in line 70 is too high, the high pressure switch is activated, causing the compressor 60 to turn off. Preferably, the high pressure cut off switch 74 can be set at 350 psi. When the pressure in the line reaches 350 psi, the switch causes the compressor to turn off. It is expected that plugging in the line may cause the pressure to reach 350 psi.

The condensed refrigerant then flows through line 76 into the receiver tank 80 for storage. A pressure gauge 78 is provided for measuring the pressure in line 76. The liquid valve 82 is provided for opening and closing access to the receiver tank 80. A weight scale 84 and the microprocessor 86 are provided for determining the mass of refrigerant provided within the receiver tank 80. A float assembly 89 is provided in the tank for sensing overfill conditions. When the capacity of the receiver tank 80 reaches 80%, the float assembly causes a shut off in operation. The float assembly includes a float having a magnet located within the float, and a stem having a magnetic reed switch. The float is slideably connected to the stem. In operation, when the liquid refrigerant in the receiver tank 80 causes the float to reach a predetermined level, the magnet in the float causes the magnetic reed switch to close, which then open the circuit for delivering power to the compressor 60 and recovery solenoid valve 30.

The liquid valve 82 is provided with a stem extending to the bottom of the tank for drawing off liquid. A vapor valve 88 is provided for venting vapor, such as noncondensables, from the receiver tank 80. By measuring the temperature, weight, and pressure inside the receiver tank 80, one may calculate the amount of noncondensable gas, such as air, in the receiver tank 80. The presence of too much air in the receiver tank 80 may result in a pressure which is undesirably high. Because the air does not readily condense, it is expected to remain near the top of the receiver tank 80 and can be vented by opening the vapor valve 88.

Once the pressure inside the automobile air conditioning unit decreases to a predetermined level, such as 8 inches of mercury, the recovery solenoid valve 30 closes, the compressor 60 turns off, and the liquid valve 82 closes. The evacuate solenoid valve 36 opens and the vacuum pump 28 evacuates the automobile air conditioning unit. At such a low pressure, it is expected almost all of the refrigerant has been evacuated and small amounts of air and moisture remain in the automobile air conditioning unit. Thus, the vacuum pump 28 vents to the atmosphere. Once the vacuum pump 28 has run for a predetermined length of time, such as between 5 and 60 minutes, the evacuate solenoid valve 36 closes and the automobile air conditioning unit is ready to be charged with purified refrigerant. Preferably, the vacuum pump is a 1.5 cfm pump. The charge solenoid valve 34 opens and a calculated quantity of refrigerant is allowed to flow from the receiver tank 80 into the automobile air conditioning unit. The charge to the automobile air conditioning unit is determined based upon the unit specifications. Based upon the information provided by the weight scale 84, the microprocessor 86 determine the length of time the liquid valve 82 remains open in order to provide the desired charge to the automobile air conditioning unit.

Once a predetermined quantity of purified refrigerant is charged to the automobile air conditioning unit, the system is turned off. The liquid valve 82, the charge solenoid valve 34, and the manifold set valve 22 close. The valves in the hose filings 16 are closed and the hose fittings 16 can be removed from the automobile air conditioning unit.

As shown in system 11', the receiver tank 80' rests on a platform 85. When it is desirable to utilize system 11', the scale 84 can be inserted under the receiver tank 80'.

Figure 2:
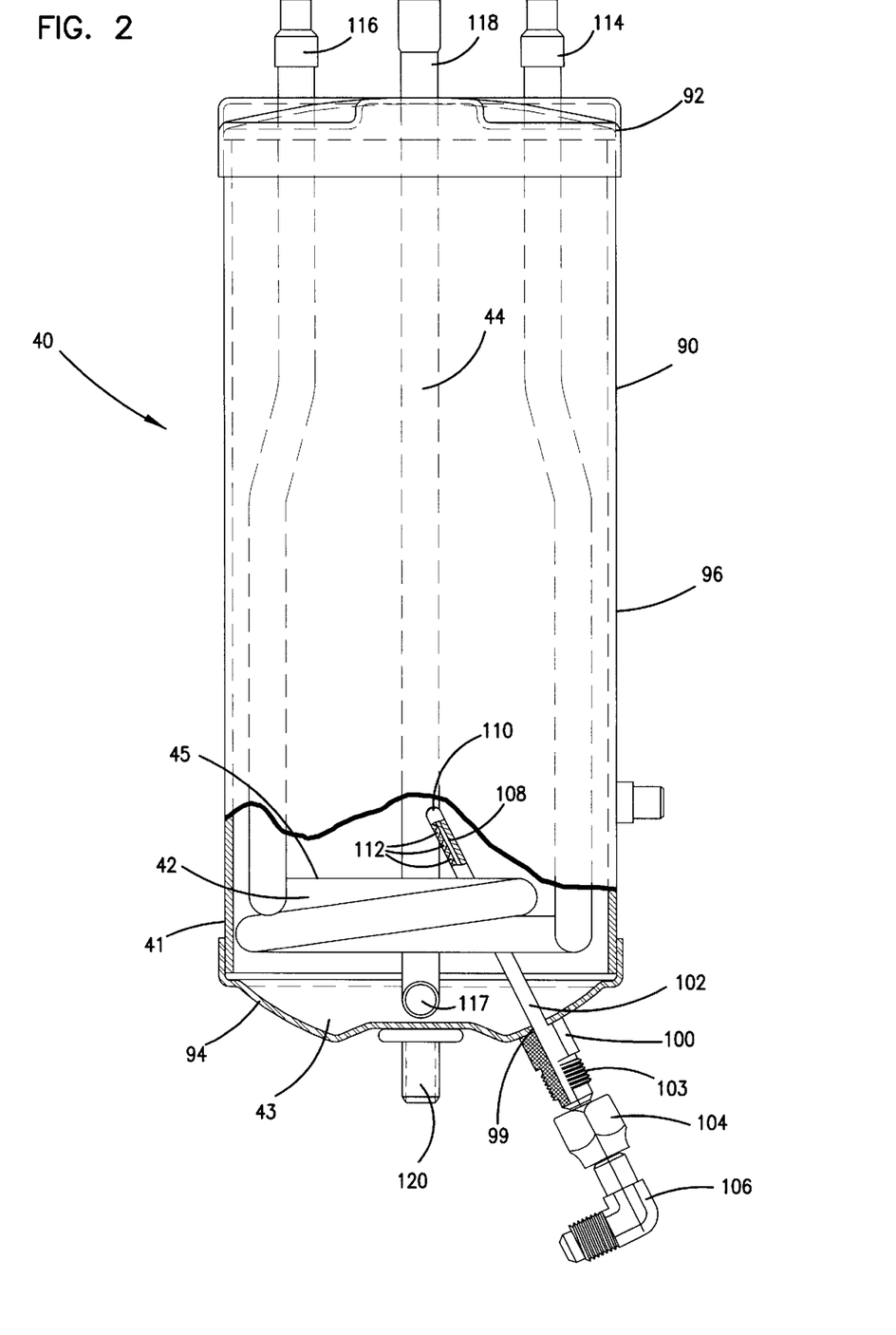
FIG. 2 shows a partial cutaway view of the heat exchanger unit in accordance with the present invention.
Figure 3:
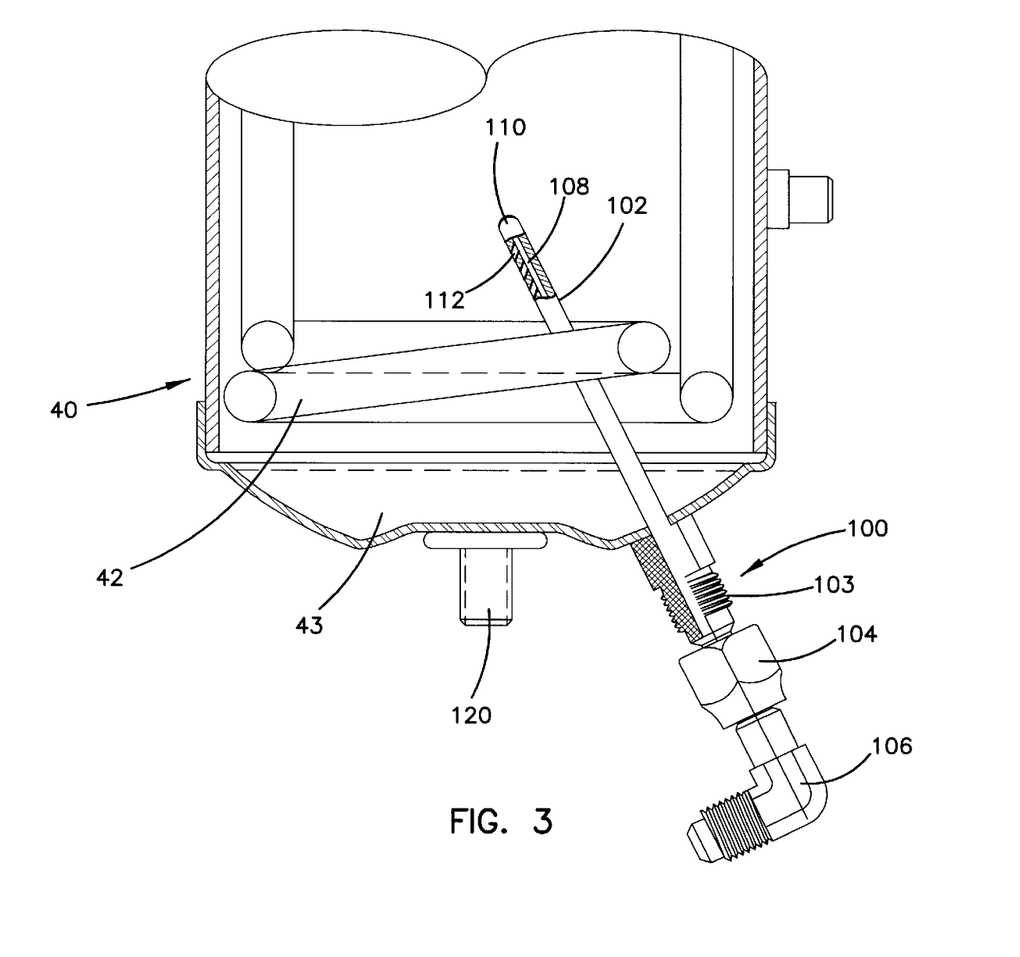
FIG. 3 shows a sectional view of the heat exchanger unit shown in FIG. 2.
Figure 4:
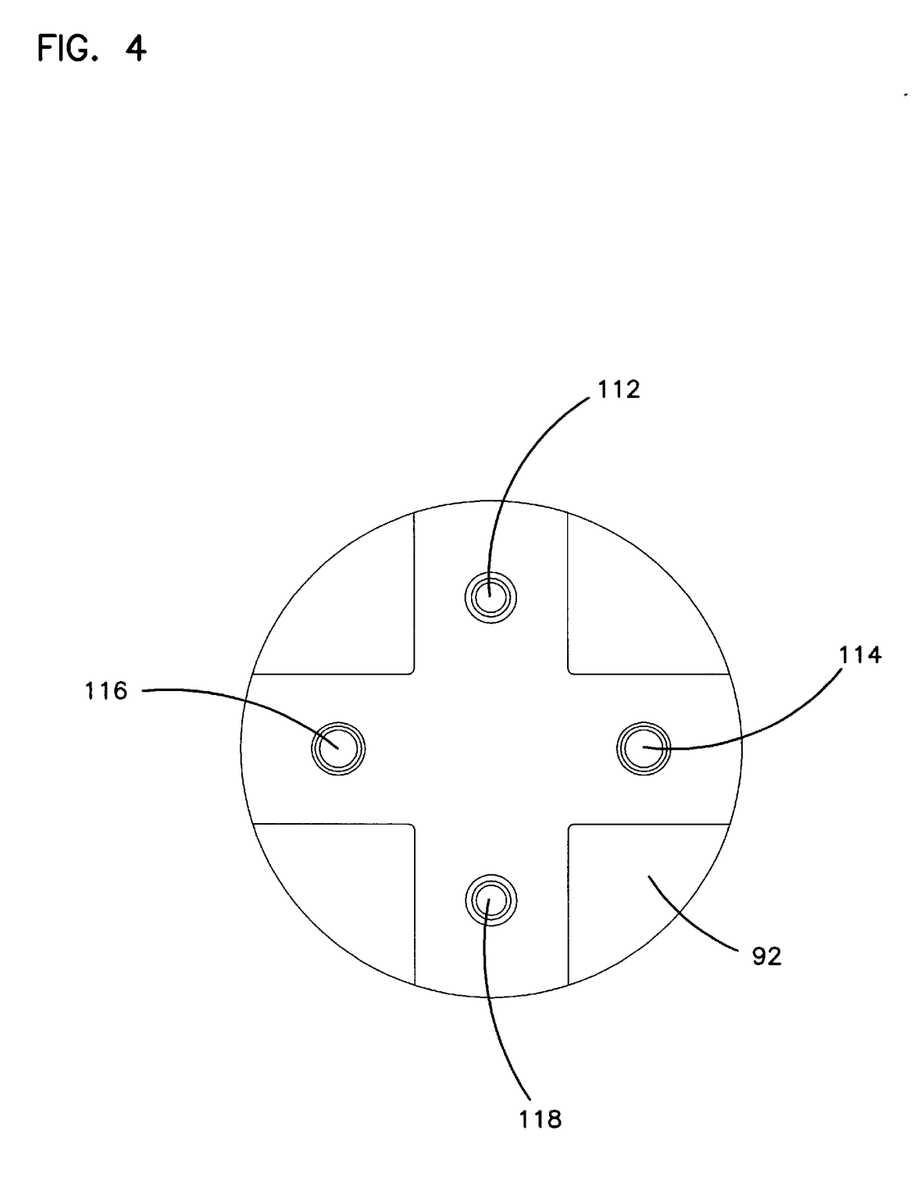
FIG. 4 shows a top view of the heat exchanger unit shown in FIG. 2.

The combined oil separator and heat exchanger 40 is shown in more detail in FIGS. 2–4. The combined oil separator and heat exchanger 40 includes a closed canister 90 having a top wall 92, a bottom wall 94, and substantially cylindrical sidewall 96. Contaminated refrigerant enters through the refrigerant inlet 99 which includes an evaporator injector 100. The injector 100 includes a stem 102 which extends through the oil puddle 43 in the lower region 41. The injector 100 additionally includes a bolt 104 and a fitting 106 which provides a seal with the bottom wall 94 when the bolt 104 is fastened to the threads 103. The stem 102 includes a narrow conduit 108, a plugged end 110, and angled orifices 112 which direct contaminated refrigerant downward onto the coils 42. As shown, the evaporator injector 100 is a short tubular construction that projects from the bottom of the heat exchanger into the lower portion of the heat exchanger volume. By providing the contaminated refrigerant proximate the coils 42, it is believed that the separation efficiency between the gas and liquid within the separator is enhanced. In addition, it is expected that the downward spray of liquid onto the coils 42 helps to agitate any accumulated liquid adjacent to the coil and improves evaporation efficiency. Furthermore, by reducing the space between the liquid and the coils 42, the liquid does not fall through the rising gas, which could cause additional condensation within the separator. Thus, by providing the injector 100 through the bottom wall 94 and directing the spray of liquid onto and proximate the coils 42, it is believed that the efficiency of the combined oil separator and heat exchanger 40 has been enhanced compared with prior art devices.

The narrow conduit 108 of the evaporator injector 100 preferably has a diameter of less than about 1/10 inch. The injector 100 should have a length which is at least sufficient to provide the angled orifices 112 above the oil puddle 43 which accumulates during the operation of the device. It is generally not desirable for the refrigerant to bubble through the puddle of oil 43. The orifices 108 should have a diameter of less than about 1/16 inch. In a preferred embodiment, there are three orifices 108 which direct the refrigerant downward onto the coils 42. The distance between the lowest orifices 108 and the coils 42 should be sufficient to provide desired agitation on the coils 42, but should not be so high that the liquid refrigerant causes undue condensation of vapor in the upper region of the canister. Preferably, the upper orifice will be no more than about 5 inches above the top plane 45 of the coils 42, and more preferably less than about 4 inches. The lowest orifice should be at least about 0.5 inches from the top plane 45 of the coil 42, and more preferably at least about 1 inch above the top plane 45. More preferably, the orifices are provided between about 1 and 3 inches from the plane.

The combined oil separator and heat exchanger 40 includes a low pressure, volatile refrigerant outlet 112 through the top wall 92. Thus, volatile refrigerant leaves through the outlet 112 for the filter/dryer 50, and then the compressor 60. After being compressed, the refrigerant enters the combined oil separator and heat exchanger 40 for condensing the vapor refrigerant to liquid refrigerant. The vapor refrigerant enter through the high pressure vapor refrigerant inlet 114, travels through the coils 42 and condenses therein, and exits via the high pressure liquid refrigerant outlet 116. The vapor refrigerant inlet 114 and the liquid refrigerant outlet 116 are provided through the top wall 92. Thus, the coil 42 permits the utilization of the heat of compression for heating the refrigerant entering the combined oil separator and heat exchanger 40, at the same time cooling the purified refrigerant headed for the receiver tank 80.

During the evaporation of the contaminated refrigerant in the combined oil separator and heat exchanger 40, oil is separated from the refrigerant. The separated oil collects at the bottom of the canister 90 in oil puddle 43. An oil drain pipe 44 extends from the top wall 92, down into the oil puddle 43 near the bottom of the canister 90 and includes an opening 117. The oil drain pipe 44 extends through the oil outlet 118 in the top wall 92 and is connected to a drain valve 46. When the drain valve is opened, the pressure inside the canister 90 pushes the oil up the oil drain pipe and through the drain valve. The canister 90 includes a stem 120 for mounting. When the canister is mounted via the stem 120, it is arranged so that it extends upwardly. That is, gravity would cause liquid to move or fall toward the lower region 41.

Figure 6:
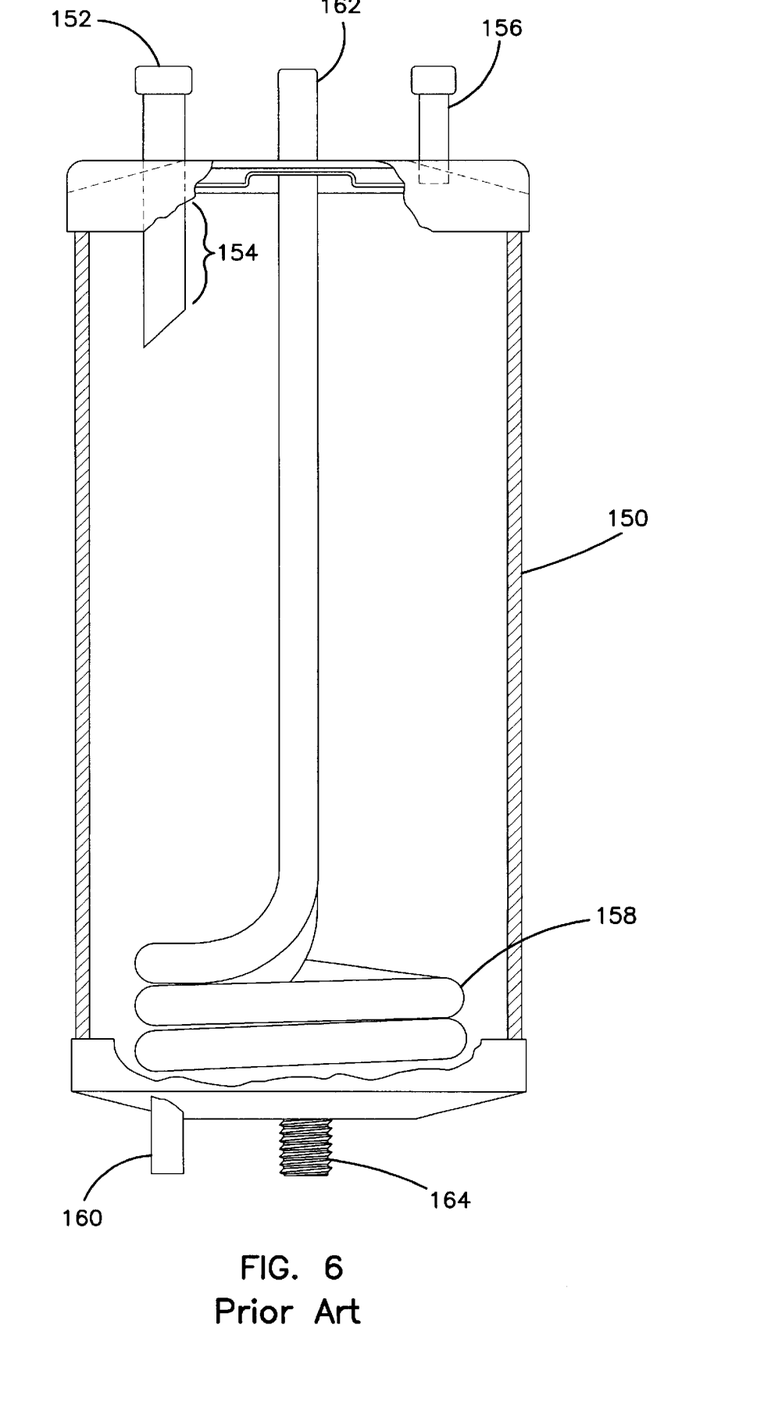
FIG. 6 shows a prior art recovery and separation tank for use in an apparatus for recovering and recycling refrigerants.

A preferred method for preparing the combined oil separator and heat exchanger 40 is to modify a commercially device. Such a commercially available oil separator is called a refrigeration receiver and is available from Refrigeration Research, Inc. An embodiment of such an oil separator is disclosed in U.S. Pat. No. 5,379,607 to Sergius, the entire disclosure of which is incorporated herein by reference. The "recovery and separation tank" described by U.S. Pat. No. 5,379,607 is shown in FIG. 6 at reference numeral 150. The recovery and separation tank 150 is vertically mounted four liter tank including a product inlet 152 which includes a portion 154 which extends into the tank a short distance, and a product outlet 156 mounted flush with the top of the tank. It is understood that the purpose of the portion 154 is to reduce short circuiting the tank by having product flow directly from the product inlet 152 to the product outlet 156. While the "short circuiting" effect can be reduced by utilizing the portion 154, it is not eliminated. The tank 150 additionally includes a heating coil 158 including two coils of pressure line located adjacent the bottom of the tank, and a contaminant outlet 160 which extends from the bottom of the tank. The heating coil inlet 162 provides pressurized fluid to the heating coil 158, and the stem 164 is provided for mounting.

The tank 150 can be modified to provide the combined oil separator and heat exchanger according to the present invention. The modification includes steps of replacing the product inlet 152 and portion 154 with an oil outlet tube extending to the bottom of the tank, and replacing the contaminant outlet 160 with an evaporator injector. The result is a combined oil separator and heat exchanger as shown in FIGS. 2–4.

Another prior art canister is provided by U.S. Pat. No. 4,809,520 to Manz et al. This device attempts to overcome the short circuiting problem by providing a slanted or sloped deflector or baffle which forces incoming refrigerant laterally outwardly beneath the canister top into the open internal volume. Similarly, the outlet includes a baffle oriented laterally diametrically oppositely of the identical opening in the inlet fitting. This structure is described by U.S. Pat. No. 4,809,520 at column 4, lines 45–64, the disclosure of which is incorporated herein by reference. While such a structure may help reduce the short circuiting effect, it is believed that the structure suffers from efficiency problems because of a redistillation or condensation effect created by cold liquid falling through warm vapor. The present invention, in contrast, reduces the amount of condensation created by cold liquid passing through warm gas, and further avoids the need to rely upon heat exchange at the walls of the cylinder to assist in evaporating the liquid refrigerant.

Figure 5:
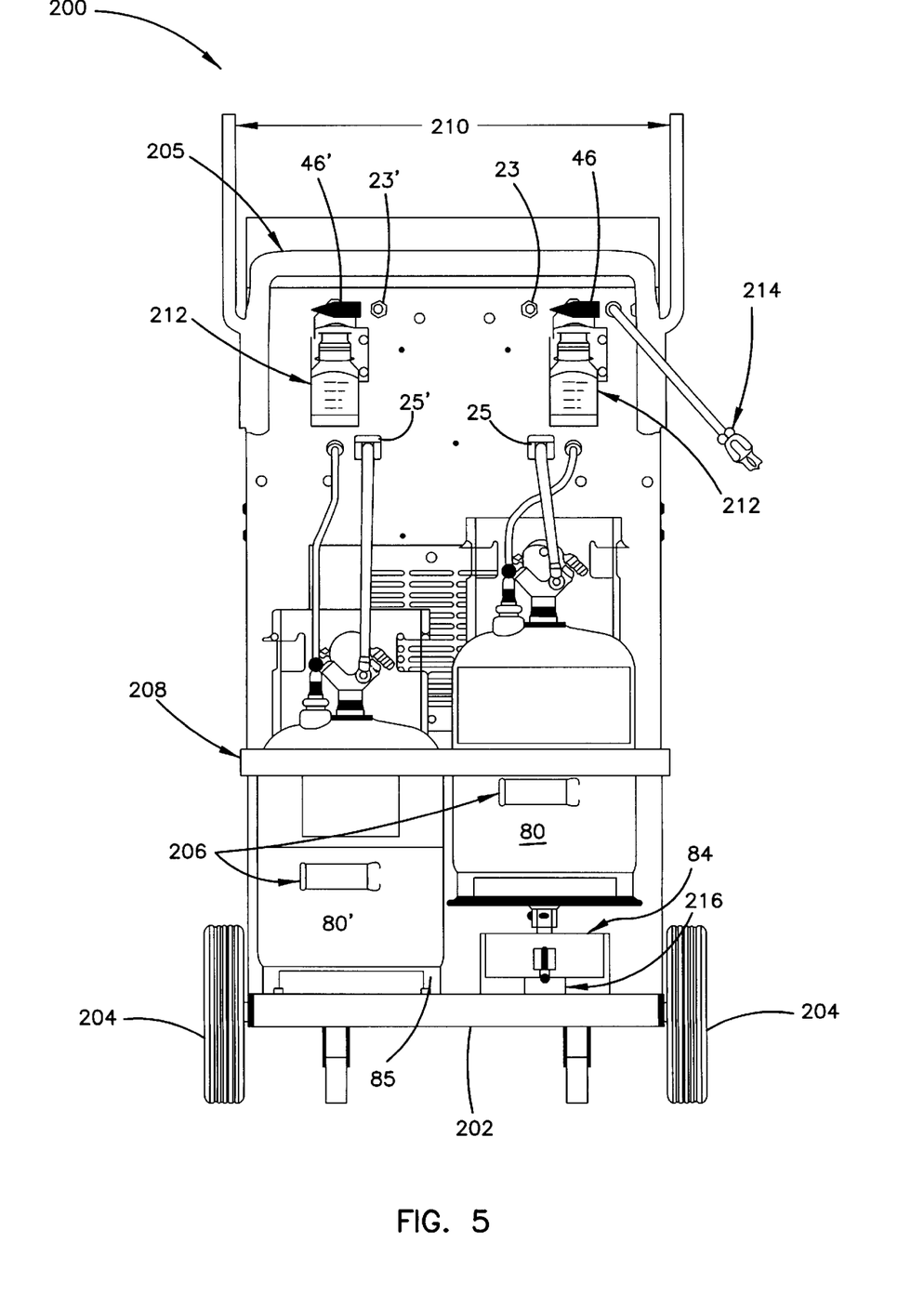
FIG. 5 shows a portable apparatus for recovering and recycling refrigerants according to the principles of the invention.

A dual refrigerant recovery and recycling system of the invention is shown assembled as a portable unit at reference numeral 200. The portable unit 200 includes a frame 202, and wheels 204 for transporting the assembly. Provided on the receiver tanks are thermometers 206 for indicating tank temperature, a tank bracket 208 for preventing the tanks from tipping when the unit is transported, a handle 205 is provided for assisting in the transportation of the unit 200, and bulkhead ports 23 and 23' for attaching the manifold hose. The manifold brackets 210 are provided for hanging the manifold and storing hoses. The oil collection flask 212 is provided for collecting oil which drains through the valve 46. A power cord 214 is provided for attachment into a standard 120 V, 60 Hz outlet. The bulkhead ports 25 and 25' are provided for attaching the receiver tank hose. Additionally included with the scale 84 is a charging scale shipping bracket 216 which locks the scale 84 in place to guard against shipping damage. Although not shown, additionally included within the unit is a keyboard and display including a recover switch which initiates the compressor, beginning the recycling processes; a vacuum pump timer which controls the run time of the vacuum pump from 5 minutes to 60 minutes; an evacuation switch which starts the vacuum pump; a main power switch which supplies electricity to the microprocessor control and starts the fan; a selector switch which allows the operator to select whether R-134A or R-12 refrigerant is being processed. Additionally included is an indicator lamp which informs the operator of a high pressure cutout condition and another indicator lamp will inform operator when storage tank is full, and a set indicator which informs the operator the system is in the set mode and data may be entered.

While the invention has been described in the context of recovering and recycling refrigerant from an automobile air conditioning unit, it should be understood that principles of the invention, including the apparatus and method, can be applied to recovering and purifying refrigerant from other sources including refrigerators, freezers, and home and commercial air conditioning systems. In addition, it should be understood that the invention can be practiced for processing refrigerants other than R-12 and R-134a. While the invention has been described with reference to a dual system, it should be understood that the invention includes single and multiple refrigerant recovery and recycle systems.

We claim:

1. An apparatus for recovering and recycling refrigerant from an air conditioning unit comprising:
   a contaminated refrigerant recovery line for conveying contaminated refrigerant;
   a combined oil separator and heat exchanger for condensing purified refrigerant and for vaporizing contaminated refrigerant, the combined oil separator and heat exchanger comprising a canister having a top wall, a bottom wall, and a substantially cylindrical side wall, the canister including:
      high pressure region comprising heat exchange coils and having high pressure inlet for providing purified refrigerant vapor and high pressure outlet for removing purified refrigerant liquid; and
      low pressure region having low pressure inlet for introducing contaminated refrigerant proximate the heat exchange coils, low pressure outlet through the top wall for removal of refrigerant vapor, and condensed oil outlet for removal of condensed oil;
   wherein the low pressure inlet comprises an evaporator injector including a tube for conveying contaminated refrigerant inside the combined oil separator and heat exchanger, said orifices directed downward for spraying contaminated refrigerant onto the coils;
   dryer for removal of moisture from vapor refrigerant from the low pressure outlet of the combined oil separator and heat exchanger;
   compressor for compressing refrigerant from the dryer to provide purified refrigerant for feeding to the high pressure inlet in the combined oil separator and heat exchanger; and
   receiver tank for receiving condensed purified refrigerant from the high pressure outlet of the combined oil separator and heat exchanger.

2. An apparatus for recovering and recycling refrigerant from an air conditioning unit according to claim 1, wherein the orifices are provided within about 5 inches of the coils.

3. An apparatus for recovering and recycling refrigerant from an air conditioning unit according to claim 1, wherein the high pressure inlet and the high pressure outlet are provided through the top wall.

4. An apparatus for recovering and recycling refrigerant from an air conditioning unit according to claim 1, wherein the low pressure inlet is provided through the bottom wall.

5. An apparatus for recovering and recycling refrigerant from an air conditioning unit according to claim 1, wherein the oil outlet is provided through the top wall.

6. An apparatus for recovering and recycling refrigerant from an air conditioning unit according to claim 1, wherein the contaminated refrigerant recovery line comprises a check valve for providing one way flow of contaminated refrigerant.

7. An apparatus for recovering and recycling refrigerant from an air conditioning unit according to claim 1, wherein the receiver tank comprises a float assembly for detecting overfill condition.

8. An apparatus for recovering and recycling refrigerant from an air conditioning unit according to claim 1, further comprising a compressor oil separator for removing oil from the compressed refrigerant, and a valve for allowing separated oil to return to the compressor and for pressurizing the combined oil separator and heat exchanger.

9. A combination oil separator and heat exchanger for use in an apparatus for recovering and recycling refrigerants from an air conditioning unit comprising:

a combined oil separator and heat exchanger for condensing purified refrigerant and for vaporizing contaminated refrigerant, the combined oil separator and heat exchanger comprising a canister having a top wall, a bottom wall, and a substantially cylindrical side wall, the canister including:
high pressure region comprising heat exchange coils and having high pressure inlet for providing purified refrigerant vapor and high pressure outlet for removing purified refrigerant liquid; and
low pressure region having low pressure inlet for introducing contaminated refrigerant proximate the heat exchange coils, low pressure outlet through the top wall for removal of refrigerant vapor, and condensed oil outlet for removal of condensed oil;
wherein the low pressure inlet comprises an evaporator injector including a tube of conveying contaminated refrigerant inside the combined oil separator and heat exchanger, and orifices directed downward for spraying contaminated refrigerant onto the coils.

10. A combined oil separator and heat exchanger according to claim 9, wherein the orifices are provided within about 5 inches of the coils.

11. A combined oil separator and heat exchanger according to claim 9, wherein the high pressure inlet, high pressure outlet, low pressure outlet, and oil outlet are provided through the top wall, and the low pressure inlet is provided through the bottom wall.

12. A combined oil separator and heat exchanger according to claim 9, wherein the oil outlet comprises a tube which extends through the top wall, and includes an opening proximate the bottom wall for recovery of oil collecting on the bottom wall.

* * * * *

UNITED STATES PATENT AND TRADEMARK OFFICE
CERTIFICATE OF CORRECTION

PATENT NO. : 5,934,091
DATED : AUGUST 10, 1999
INVENTOR(S) : HANSON ET AL.

It is certified that error appears in the above-identified patent and that said Letters Patent is hereby corrected as shown below:

Col. 1, line 59: "Modem" should read --Modern--

Col. 4, line 40: delete "of" after the word "evacuate"

Col. 5, line 11: insert --of-- after the word "amount"

Col. 6, line 48: "open" should read --opens--

Col. 7, line 15: "determine" should read --determines--

Col. 8, line 17: "enter" should read --enters--

Col. 8, line 43: insert --available-- after the word "commercially"

Col. 8, line 51: insert --a-- after the word "is"

Col. 9, line 51: insert --the-- after the word "inform"

Col. 11, line 17, claim 9: "of" should read --for--

Signed and Sealed this

Twenty-seventh Day of March, 2001

Attest:

NICHOLAS P. GODICI

*Attesting Officer*

*Acting Director of the United States Patent and Trademark Office*